(12) United States Patent
Wang (10) Patent No.: US 7,380,418 B2
(45) Date of Patent: Jun. 3, 2008

(54) CONTINUOUS FORMING SYSTEM FOR PRODUCING LENSES

(75) Inventor: Meng-Kun Wang, Taichung (TW)

(73) Assignee: Asia Optical Co., Inc., T.E.P.Z., Taichung (TW)

( * ) Notice: Subject to any disclaimer, the term of this patent is extended or adjusted under 35 U.S.C. 154(b) by 415 days.

(21) Appl. No.: 11/109,589

(22) Filed: Apr. 19, 2005

(65) Prior Publication Data
US 2006/0032273 A1 Feb. 16, 2006

(30) Foreign Application Priority Data
Aug. 10, 2004 (TW) .............................. 93123910 A (51) Int. Cl.
*C03B 11/04* (2006.01)
(52) U.S. Cl. ..................... 65/246; 65/227; 65/260; 65/361
(58) Field of Classification Search ............... 65/246, 65/227, 78, 260, 165, 357–361
See application file for complete search history.

(56) References Cited

U.S. PATENT DOCUMENTS

| | | | | |
|---|---|---|---|---|
| 2,424,235 | A * | 7/1947 | Hoffer ..................... 249/53 R |
| 4,148,954 | A * | 4/1979 | Smarook ................... 428/116 |
| 5,013,348 | A * | 5/1991 | Hirota ......................... 65/102 |
| 5,173,100 | A * | 12/1992 | Shigyo et al. .............. 65/102 |
| 5,246,476 | A * | 9/1993 | Yoshimura et al. ....... 65/29.19 |
| 5,306,324 | A * | 4/1994 | Vehmas et al. ............. 65/104 |
| 5,322,541 | A * | 6/1994 | Shimizu et al. .............. 65/66 |
| 5,974,836 | A * | 11/1999 | Radermacher et al. ...... 65/273 |
| 6,698,241 | B1* | 3/2004 | Schwarzer ................ 65/29.12 |
| 6,983,624 | B2* | 1/2006 | Yli-Vakkuri ................ 65/274 |
| 7,159,420 | B2* | 1/2007 | Autery et al. ................. 65/66 |

* cited by examiner

*Primary Examiner*—Steven P. Griffin
*Assistant Examiner*—DeMaris R. Wilson
(74) *Attorney, Agent, or Firm*—McNees Wallace & Nurick, LLC (57) ABSTRACT

A continuous glass forming system includes a forming room and at least one forming unit which is advanced successively through a first loading/unloading station, a first heating station, a first forming station, and a first cooling station which are provided within the forming room. The forming unit includes lower and upper mold units, and a sleeve member removably assembled between the lower and upper mold units. The lower and upper mold units have respective first and second forming faces to form a glass blank into a lens. The sleeve member has support faces to support respectively the glass blank and lens. A transfer device moves into or out of the forming room to load or unload the sleeve member into or from the forming unit.

8 Claims, 12 Drawing Sheets

CONTINUOUS FORMING SYSTEM FOR PRODUCING LENSES

CROSS-REFERENCE TO RELATED APPLICATION

This application claims priority from Taiwanese Invention Patent Application No. 93123910, filed on Aug. 10, 2004.

BACKGROUND OF THE INVENTION

1. Field of the Invention

This invention relates to a forming system for forming glass, more particularly to a continuous forming system for producing optical lenses.

2. Description of the Related Art

Figure 1:
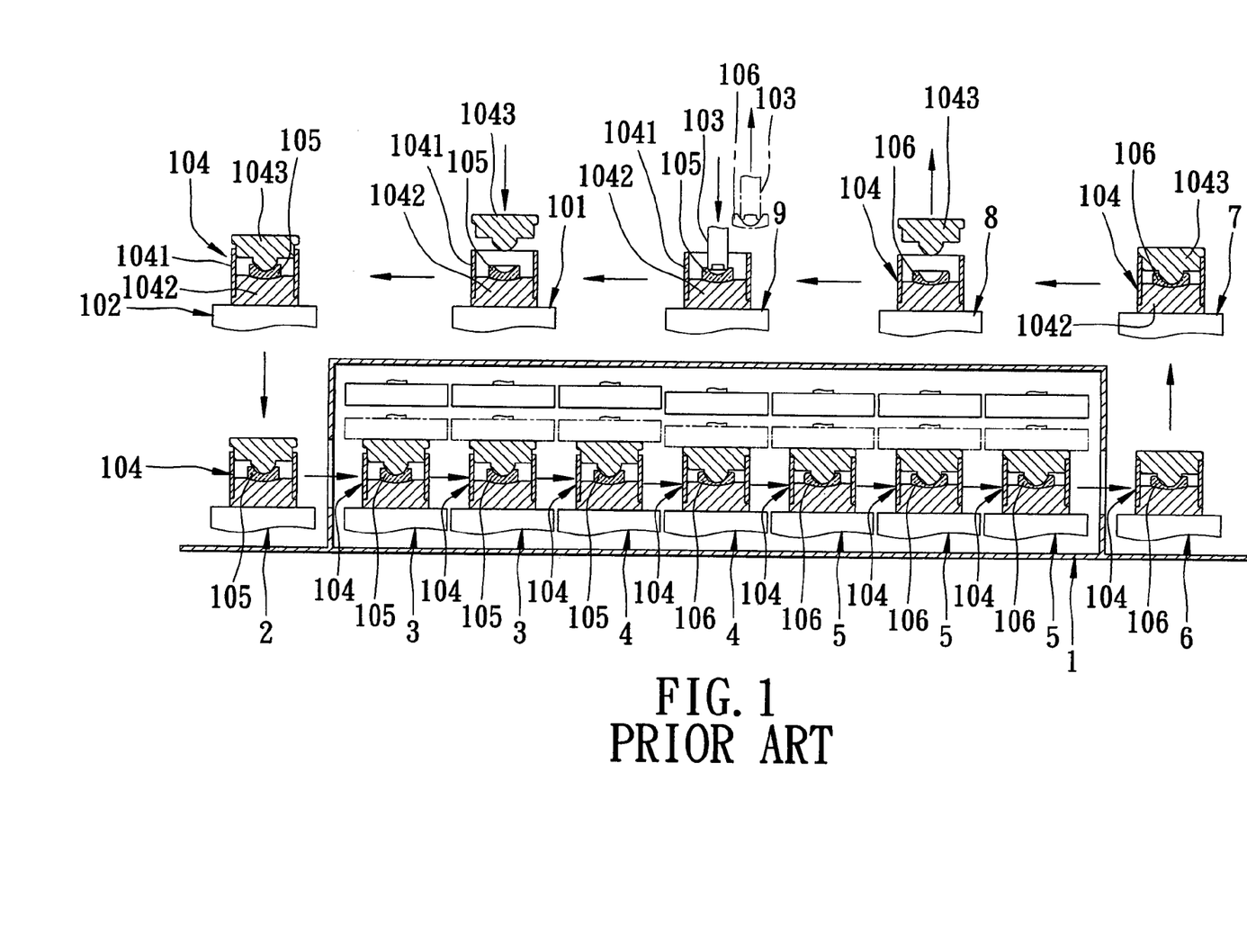
FIG. 1 shows a conventional forming system for producing lens.
Figure 2:
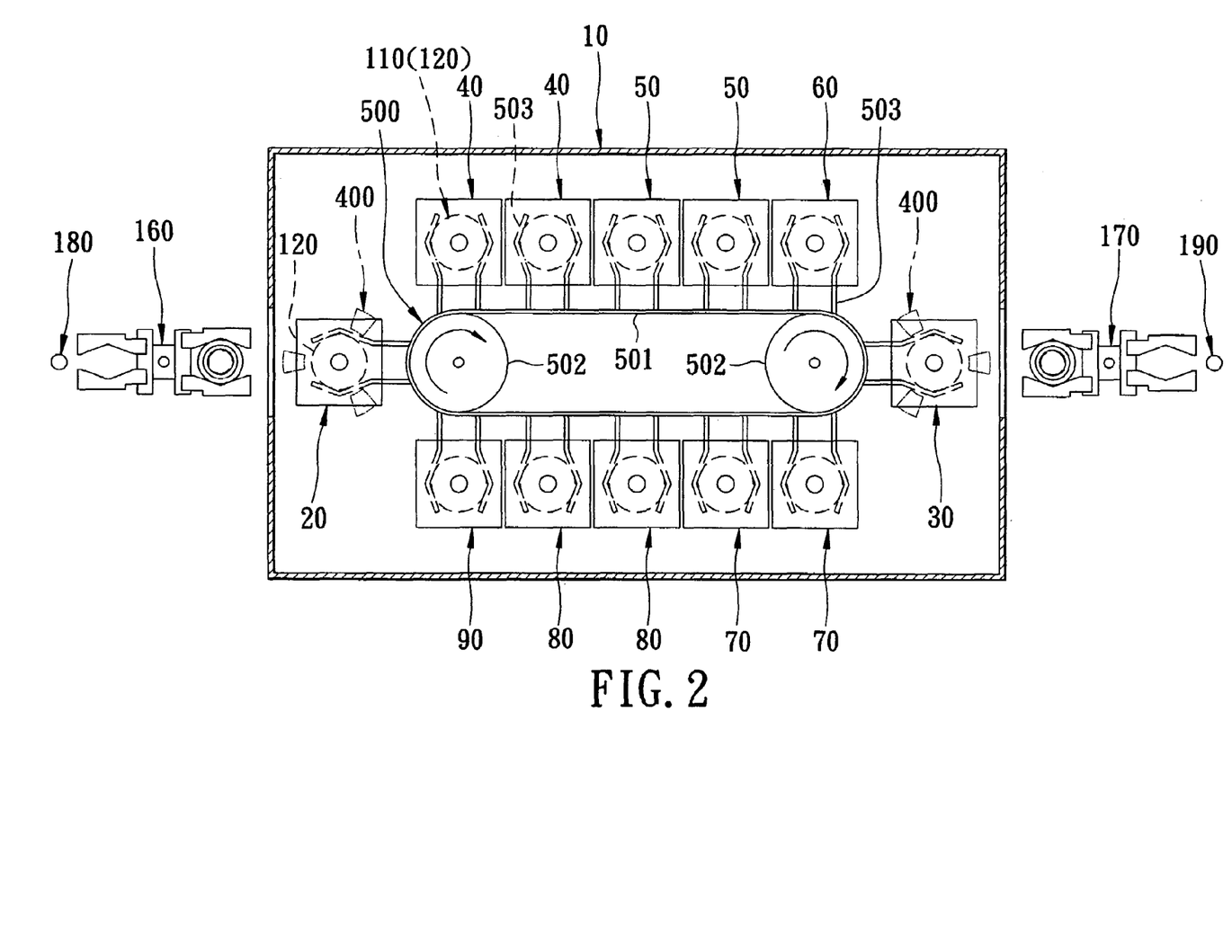
FIG. 2 is a plan view of a forming system embodying the present invention.

Referring to FIG. 1, a typical forming system for producing optical glasses, includes a forming room 1, a first standby zone 2 adjacent to an entrance of the forming room 1, two successive heating zones 3 disposed in the forming room 1 adjacent to the first standby zone 2, two successive forming zones 4 disposed in the forming room 1 adjacent to the heating zones 3, three successive cooling zones 5 disposed in the forming room 1 adjacent to the forming zones 4, a second standby zone 6 disposed adjacent to an exit of the forming room 1 immediately downstream of the cooling zones 5, a third standby zone 7 downstream of the second standby zone 6, a separation zone 8 downstream of the third standby zone 7, a replacement zone 9 downstream of the separation zone 8, an assembly zone 101 downstream of the replacement zone 9, a fourth standby zone 102 disposed between the first standby zone 2 and the assembly zone 101, a suction nozzle 103 disposed adjacent to the replacement zone 9 for sucking lens or glass blanks, and fourteen sets of forming units 104 disposed respectively in the aforesaid zones. Each forming unit 104 includes a sleeve member 1041, a lower molding core 1042 disposed in the sleeve member 1041 for holding a glass blank 105, and an upper molding core 1043 movably disposed in the sleeve member 1041 above the lower molding core 1042.

When a continuous production operation of lenses starts in the forming system, the forming units 104 together with glass blanks 105 thereon are moved successively from the first standby zone 2 to the heating zones 3 to soften the glass blanks 105. Thereafter, the forming units 104 are moved one after the other to the forming zones 4 for press-forming the glass blanks 105 into lenses 106, and further to the cooling zones 5 to cool down the lenses 106. Afterwards, the forming units 104 together with the lenses 106 are moved successively to the second standby zone 6 where the forming units 104 are picked up by a robot arm (not shown) one after the other to the third standby zone 7. The forming units 104 with the lenses 106 are then moved to the separation zone 8 at which each upper molding core 1043 is separated from the corresponding lower molding core 1042 and from which each lower molding core 1042 with the corresponding sleeve member 1041 is moved to the next replacement zone 9. At this stage, the suction nozzle 103 is moved downward to pick up the lens 106 from each lower molding core 1042 for removal to a storage region (not shown), and then brings a glass blank 105 from another storage region to each lower molding core 1042. Each glass blank 105 is then brought by the corresponding lower molding core 1042 and sleeve member 1041 to the assembly zone 101 where a robot arm (not shown) is used to assemble each lower molding core 1042 with another upper molding core 1043. Finally, each forming unit 104 together with the glass blank 105 is moved to the fourth standby zone 102 and then resent to the first standby zone 2 for continuous operation.

In the aforesaid forming system, since separation and assembly of each forming unit 104 are carried out separately at two different zones, i.e. the separation and assembly zones 8 and 101, additional operation steps are necessary to transfer the forming units 104 between the two zones, thus increasing the complexity of the operation and the construction of the system and adversely affecting the production rate. In addition, the need to perform aligning and positioning of the components of each forming unit 104 in each of the two zones also complicates the forming system.

Furthermore, it is difficult to center the glass blank 105 with respective to the central axis of the sleeve member 1041 of the forming unit 104 so that the glass blank 105 is vulnerable to positional deviation when being transferred to the replacement zone 9, or to the assembly zone 101 from the replacement zone 9. The positional deviation can result in defective products with asymmetric thickness.

SUMMARY OF THE INVENTION

An object of the present invention is to provide an efficient and inexpensive glass forming system which can address the problems encountered by the above-described prior art.

According to one aspect of the present invention, a continuous glass forming system comprises: a forming room having a first port; a first loading/unloading station disposed within the forming room proximate to the first port; at least one first heating station disposed proximate to the first loading/unloading station; at least one first forming station disposed proximate to the first heating station; a first cooling station disposed proximate to the first forming station; and a forming device which is advanced successively through the first loading/unloading, first heating, first forming, and first cooling stations. The forming device includes at least one forming unit which has a lower mold unit, an upper mold unit, and a sleeve member removably assembled between the lower and upper mold units. The sleeve member includes a sleeve wall which defines a slot. The sleeve wall has a first shoulder face disposed around the slot and adapted to support a glass blank, and a second shoulder face disposed around the slot and adapted to support a lens formed from the glass blank. The lower and upper mold units respectively have first and second forming faces which are adapted to form the glass blank into the lens within the slot.

According to another aspect of the present invention, a continuous glass forming system comprises: a forming room having a first port; a first loading/unloading station disposed within the forming room proximate to the first port; at least one first heating station disposed proximate to the first loading/unloading station; at least one first forming station disposed proximate to the first heating station; a first cooling station disposed proximate to the first forming station; and a forming device which is advanced successively through the first loading/unloading, first heating, first forming, and first cooling stations. The forming device includes at least one forming unit, and a first transfer device disposed proximate to the first port and being movable into and out of the forming room to load a glass blank into the forming device and to unload from the forming device a lens formed from the glass blank.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENT

Referring to FIGS. 2-5, there is shown a preferred embodiment of the forming system according to the present invention which may be used in a continuous forming process for forming a glass blank 200 of small diameter (D1) into a lens 300 of large diameter (D2). The glass blank 200 has a bottom face 210, an opposite top face 220 and a lateral face 230 interconnecting the bottom and top faces 210, 220. The forming system includes a forming room 10, a first loading/unloading station 20, a second loading/unloading 30, two first heating stations 40, two first forming stations 50, a first cooling station 60, two second heating stations 70, two second forming stations 80, a second cooling station 90, a forming device 110 having a plurality of forming units 120, a first transfer device 160, a second transfer device 170, a first suction device 180, a second suction device 190, and an advancing device 500 for holding and moving the forming units 120. The advancing device 500 may be of any construction which can hold and advance the forming units 120 within the forming room 10. In this embodiment, the advancing device 500 is in the form of a looped conveyer 501 which passes over two rollers 502 and which has a plurality of spaced apart holders 503 to hold the respective forming units 120. To ease understanding of the present invention, the elements of the forming system are shown in FIGS. 3 to 12 are rotated by 90 degrees relative to the forming room 10.

Figure 3:
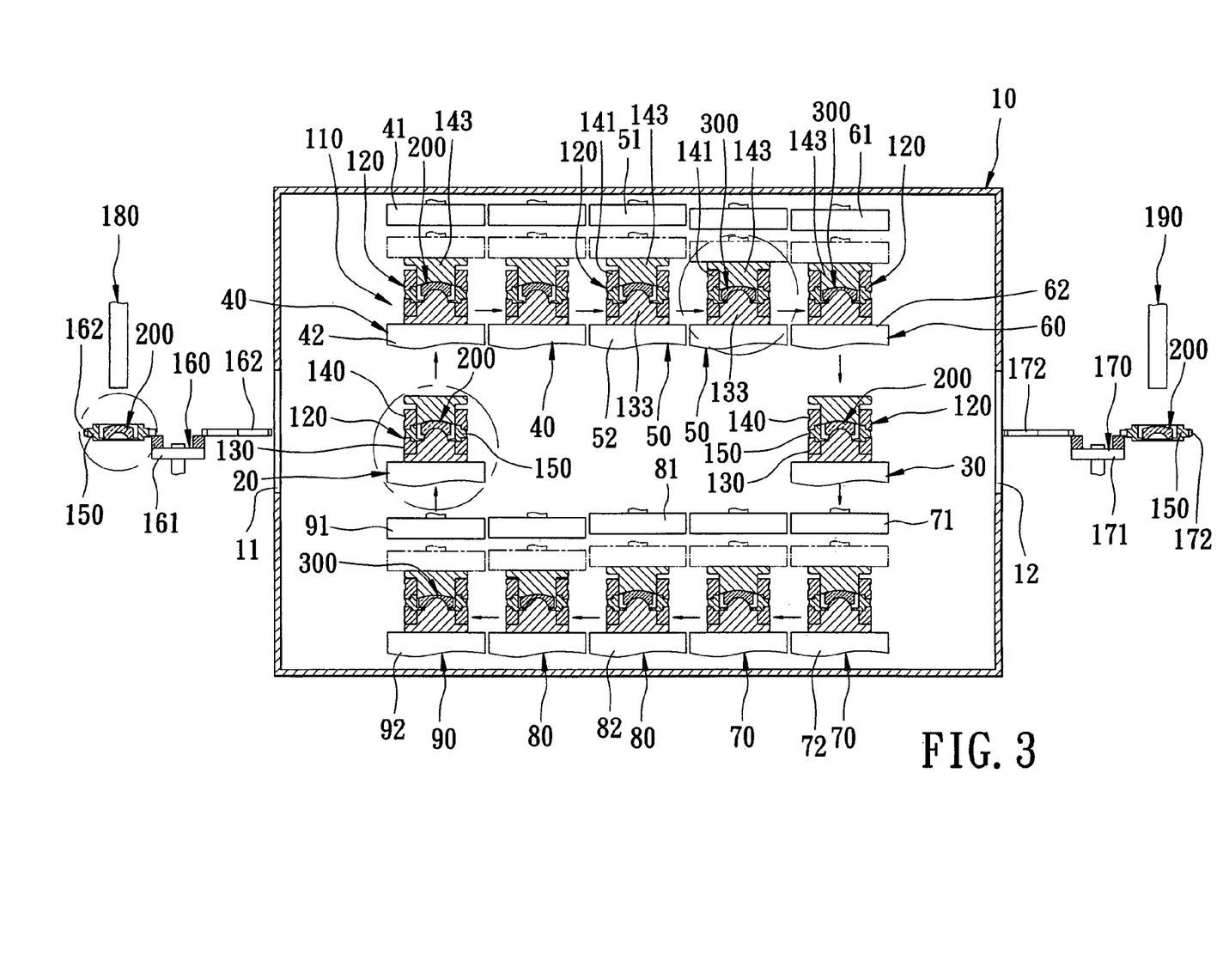
FIG. 3 is another plan view of the forming system of FIG. 2 in which elements of the forming system are rotated by 90 degrees with respect to the forming room.
Figure 4:
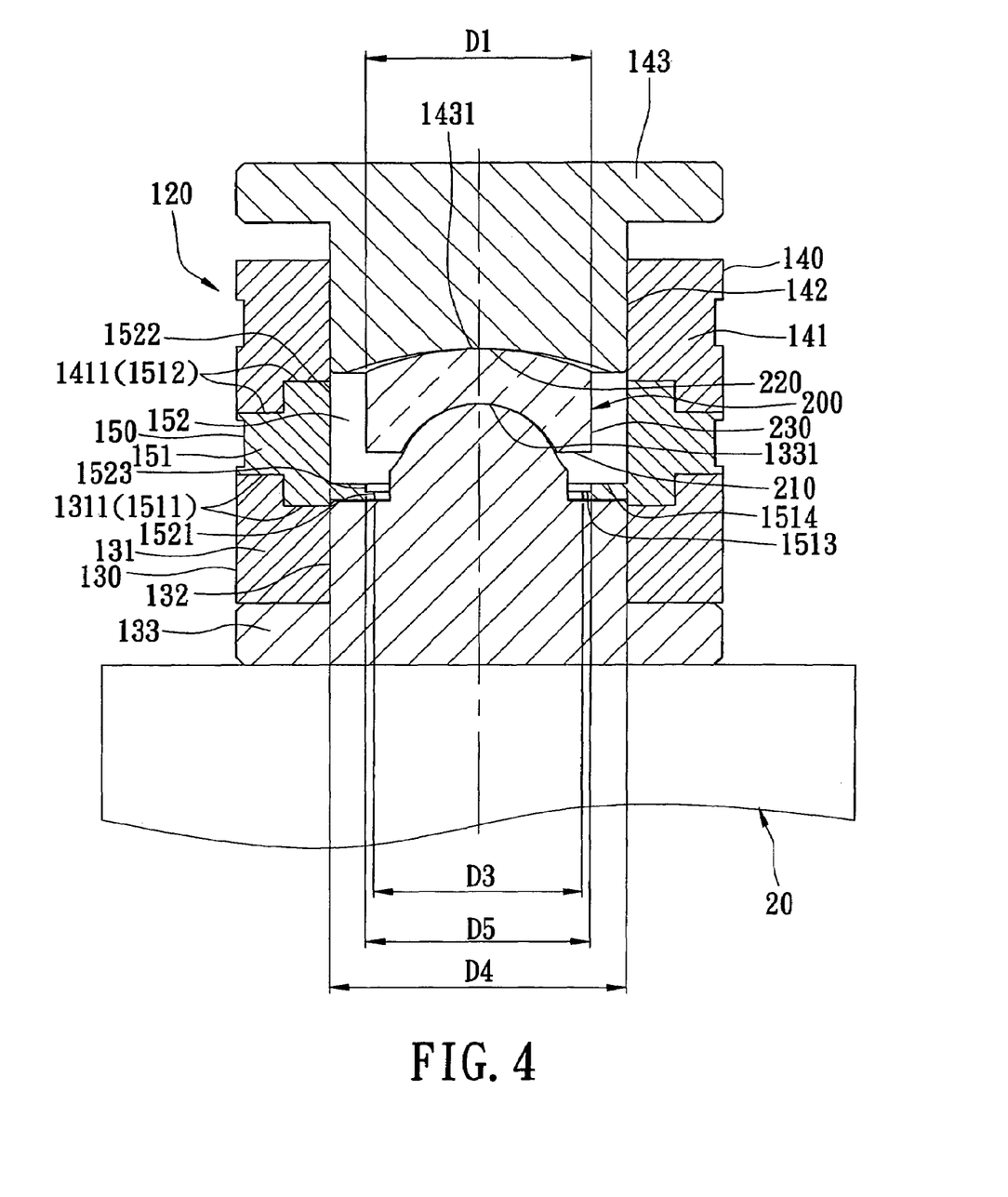
FIG. 4 is a sectional view of a forming unit of the forming system of FIG. 2.
Figure 5:
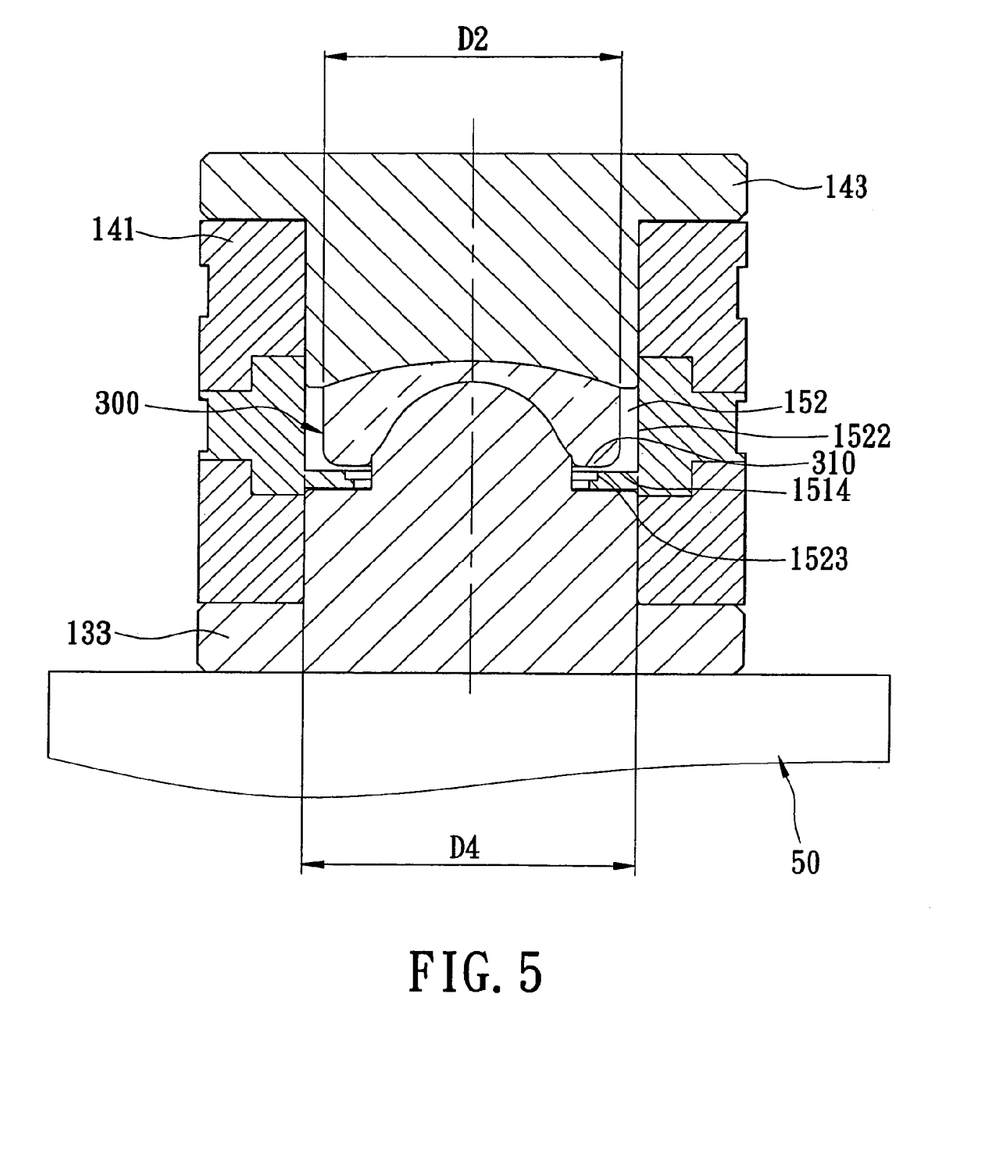
FIG. 5 is the same view as FIG. 4 but with a glass blank being pressed between lower and upper molding cores.

As shown in FIGS. 3-5, the forming room 10 includes first and second ports 11, 12. The first loading/unloading station 20 is disposed adjacent to the first port 11. The second loading/unloading station 30 is disposed adjacent to the second port 12.

The first heating stations 40 are disposed between the first loading/unloading station 20 and the first forming stations 50 and are adapted to perform a preheating/heating operation. Each first heating station 40 includes an upper heating plate 41 which is movable upward/downward intermittently, and a lower heating plate 42.

The first forming stations 50 are disposed between the first heating stations 40 and the first cooling station 60 to perform a preforming/forming operation. Each first forming station 50 includes a press plate 51 which is movable upward/downward intermittently, and a base plate 52.

The first cooling station 60 is disposed between the first forming stations 50 and the second loading/unloading station 30. The first cooling station 60 includes an upper cooling plate 61 and a lower cooling plate 62.

The second heating stations 70 are disposed between the second loading/unloading station 30 and the second forming stations 80 to perform a preheating/heating operation. Each second heating station 70 includes an upper heating plate 71 which is movable upward/downward intermittently, and a lower heating plate 72.

The second forming stations 80 are disposed between the second heating stations 70 and the second cooling station 90 to perform a preforming/forming operation. Each forming station 80 includes a pressing plate 81 which is movable upward/upward intermittently, and a base plate 82.

The second cooling station 90 is disposed between the second forming stations 80 and the first loading/unloading station 20. The second cooling station 90 includes an upper cooling plate 91 which is movable upward/downward intermittently, and a lower cooling plate 92.

The forming units 120 of the forming device 110 are provided respectively in the first and second loading/unloading stations 20, 30, the first and second heating stations 40, 70, the first and second forming stations 50, 80, and the first and second cooling stations 60, 90.

Each forming unit 120 includes a lower mold unit 130, an upper mold unit 140, and a sleeve member 150 mountable removably between the lower and upper mold units 130, 140. The forming device 110 further includes two additional sleeve members 150 which are provided near the first and second loading/unloading stations 20, 30, respectively and outwardly of the forming room 10. One of the two sleeve members 150 is held by the first transfer device 160 near the first loading/unloading station 20, whereas the other one of the two sleeve members 150 is held by the second transfer device 170 near the second loading/unloading station 30.

Since the forming units 120 have the same construction, the construction thereof will be illustrated hereinafter based on an explanation of only one forming unit 120. Referring again to FIG. 4, the lower mold unit 130 includes a lower socket member 131 defining a lower socket hole 132, and a lower molding core 133 inserted into the lower socket hole 132 of the lower socket member 131. The lower socket member 131 has a first abutment face 1311, whereas the lower molding core 133 has a first forming face 1331. In this embodiment, the first forming face 1331 is formed on a top end of the lower molding core 133, whereas the first abutment face 1311 is formed on a top end of the lower socket member 131 around the first forming face 1331. The upper mold unit 140 includes an upper socket member 141 defining an upper socket hole 142, and an upper molding core 143 inserted into the upper socket hole 142. The upper socket member 141 has a second abutment face 1411, whereas the upper molding core 143 has a second forming face 1431 confronting the first forming face 1331. In this embodiment, the second abutment face 1411 is formed on a bottom end of the upper socket member 141, and the second forming face 1431 is formed on a bottom end of the upper molding core 143. The upper molding core 143 is movable between a first position (see FIG. 4) which is away from the lower molding core 133 and a second position (see FIG. 5) which is close to the lower molding core 133.

The sleeve member 150 has a sleeve wall 151 which defines a slot 152. The slot 152 has a first slot section 1521 having a diameter (D3) which is smaller than the outer diameter (D1) of the glass blank 200, a second slot section 1522 having a diameter (D4) which is larger than the outer diameter (D2) of the lens (300) and a third slot section 1523 which has a diameter (D5) substantially equal to the outer diameter (D1) of the glass blank 200, and which interconnects the first and second slot sections 1521, 1522.

The sleeve wall 151 has a third abutment face 1511 to abut against the first abutment face 1311, a fourth abutment face 1512 to abut against the second abutment face 1411, a first shoulder face 1513 formed between the first and third slot sections 1521, 1523 to support the glass blank 200, and a second shoulder face 1514 formed between the second and third slot sections 1522, 1523 to support the lens 300. In this embodiment, the third and fourth abutment faces 1511, 1512 are formed respectively on the bottom and top ends of the sleeve wall 151 and confront respectively the lower and upper mold units 130, 140.

The first transfer device 160 is disposed adjacent to the first port 11 and is movable into and out of the forming room 10 so as to move toward and away from the first loading/unloading station 20. In this embodiment, the first transfer device 160 is a double-head mechanical claw and includes a main body 161 which is rotatable and movable upward and downward, and two opposed claws 162 supported on the main body 161. One of the claws 162 serves to load one of the sleeve members 150 into the forming unit 120 disposed on the first loading/unloading station 20, while the other claw 162 is used to unload the other one of the sleeve members 150 from the same forming unit 120 disposed on the first loading/unloading station 20. Each claw 162 is used to perform alternately loading and unloading operations.

The second transfer device 170 is disposed adjacent to the second port 12 and is movable into and out of the forming room 10 so as to move toward and away from the second loading/unloading station 30. In this embodiment, the second transfer device 170 is a double-head mechanical claw and includes a main body 171 which is rotatable and movable upward and downward, and two opposed claws 172 supported on the main body 171. One of the claws 172 serves to load one of the sleeve members 150 into one of the forming units 120 disposed on the second loading/unloading station 30 while the other claw 172 is used to unload the other one of the sleeve members 150 from the same forming unit 120 disposed on the second loading/unloading station 30. Each claw 162 is used to perform alternately loading and unloading operations.

The first suction device 180 is disposed outwardly of the forming room 10 near the first loading/unloading station 20. In this embodiment, the first suction device 180 is in the form of a suction nozzle for sucking the glass blank 200 or the lens 300.

The second suction device 190 is disposed outwardly of the forming room 10 near the second loading/unloading station 30. In this embodiment, the second suction device 190 is in the form of a suction nozzle for sucking the glass blank 200 or the lens 300.

Figure 6:
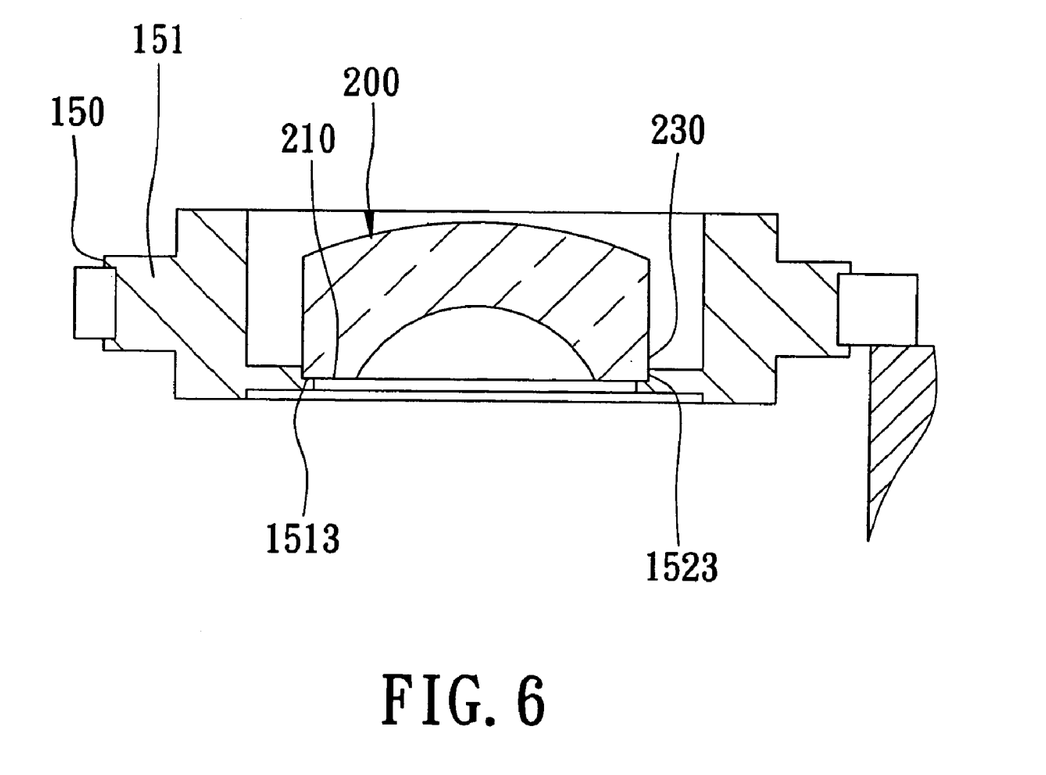
FIG. 6 is a sectional view of a sleeve member of the forming system shown in FIG. 2.

Referring to FIG. 6, when the glass blank 200 is placed on the first shoulder face 1513 of the sleeve member 150, the lateral face 230 of the glass blank 200 is bounded by the third slot section 1523. Referring again to FIGS. 3 and 4, when each sleeve member 150, which supports one of the glass blanks 200, is assembled between the corresponding upper and lower mold units 140, 130 at the first or second loading/unloading station 20 or 30, the third and fourth abutment faces 1511, 1512 of the sleeve wall 151 respectively abut against the first and second abutment faces 1311, 1411 of the lower and upper socket members 131, 141. As the first forming face 1331 of the lower molding core 133 is higher than the second shoulder face 1514 of the sleeve wall 151, the glass blank 200 is raised by the first forming face 1331 so that the glass blank 200 is moved away from the first shoulder face 1513. As the glass blank 200 is moved upward, the top face 220 of the glass blank 200 pushes the upper molding core 143 upward to a first position (see FIG. 4).

When each forming unit 120 is moved from the first loading/unloading station 20 to each first heating station 40, the upper heating plate 41 at each first heating station 40 is moved downward to contact the corresponding upper molding core 143 and cooperates with the corresponding lower heating plate 42 to heat and soften the corresponding glass blank 200. When each forming unit 120 is moved from each first heating station 40 to the adjacent first forming station 50, the press plate 51 at each first forming station 50 is moved downward to contact the corresponding upper molding core 143 and cooperate with the corresponding base plate 52 to press and preform the softened glass plate 200. When each forming unit 120 together with the preformed glass blank 200 is moved to the next first forming station 50, the corresponding upper molding core 143 is pressed downward to a second position from the first position so that the preformed glass blank 200 is formed into the lens 300. In this state, the bottom face of the lens 300 extends to a level above the second shoulder face 1514 (see FIG. 5). When each forming unit 120 is moved from the first forming stations 50 to the first cooling station 60, the upper cooling plate 61 moves downward and contacts the corresponding upper molding core 143 and cooperates with the lower cooling plate 62 to cool down and set the shape of the lens 300. Similarly, another set of the forming units 120 are moved successively from the second loading/unloading station 30 to the second heating stations 70, the second forming stations 80, and the second cooling stations 90 so that another set of glass blanks 200 are formed into lenses 300 one after another.

Figure 7:
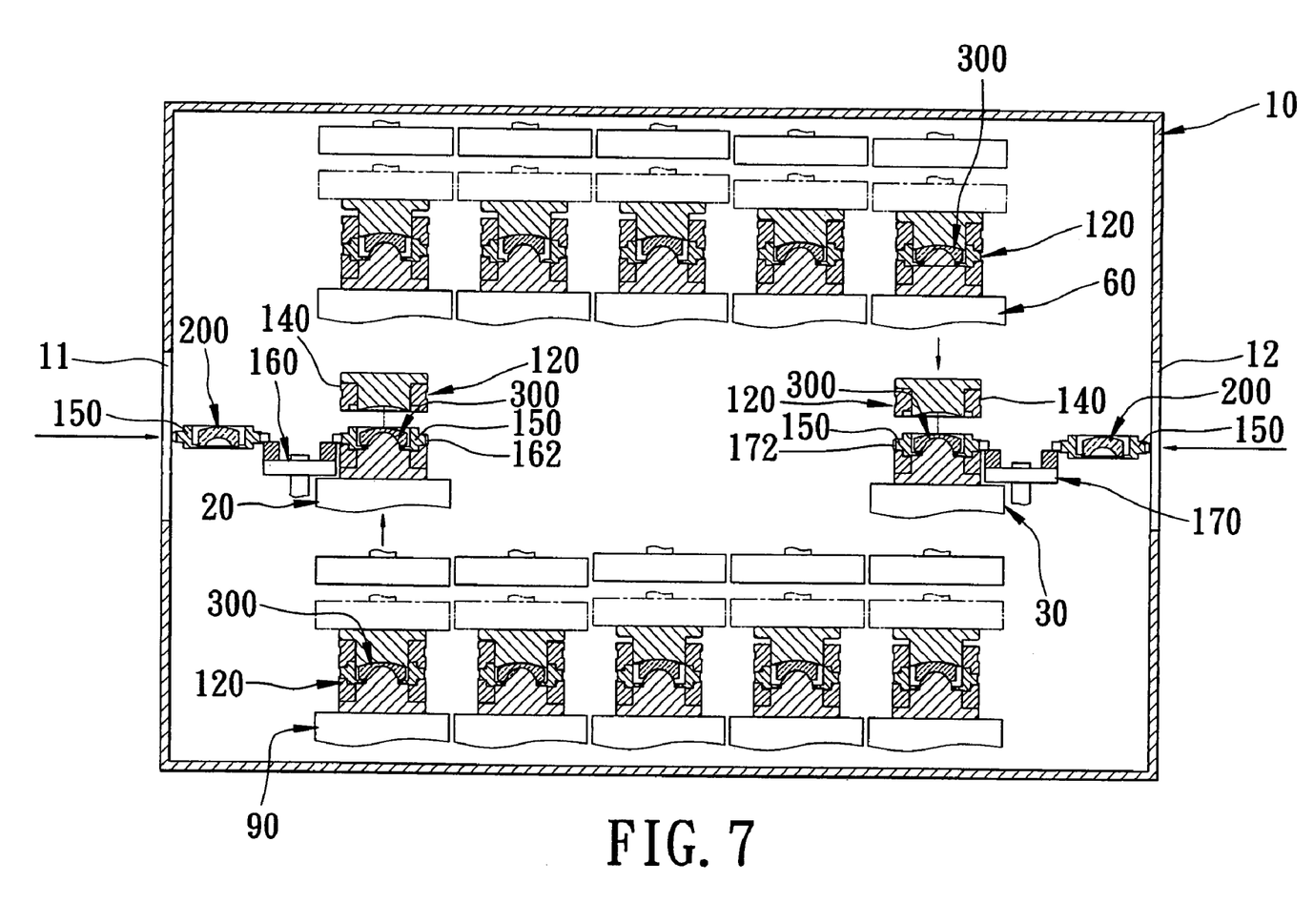
FIG. 7 is the same view as FIG. 3 but with transfer devices being moved into the forming room.

Referring to FIG. 7, whenever each forming unit 120 together with the lens 300 reaches the first or second loading/unloading station 20 or 30 from the second or first cooling station 90 or 60, the corresponding upper mold unit 140 is lifted by one of two robot arms 400 (see FIG. 2) which are disposed adjacent to the second and first ports 12, 11 of the forming room 10. In this state, the first and second transfer devices 160, 170 which carry the respective sleeve members 150 that receive respectively the glass blanks 200 move into the forming room 10 through the first and second ports 11, 12, as shown in FIG. 7, and one of the claws 161, 171 of the first or second transfer device 160 or 170 which does not carry the sleeve member 150 is used to pick up the sleeve member 150 together with the lens 300 from the corresponding lower mold unit 130 at the first or second loading/unloading station 20 or 30. Subsequently, the first and second transfer devices 160, 170 put the respective sleeve members 150 which receive the glass blanks 200 into the corresponding forming units 120.

Figure 8:
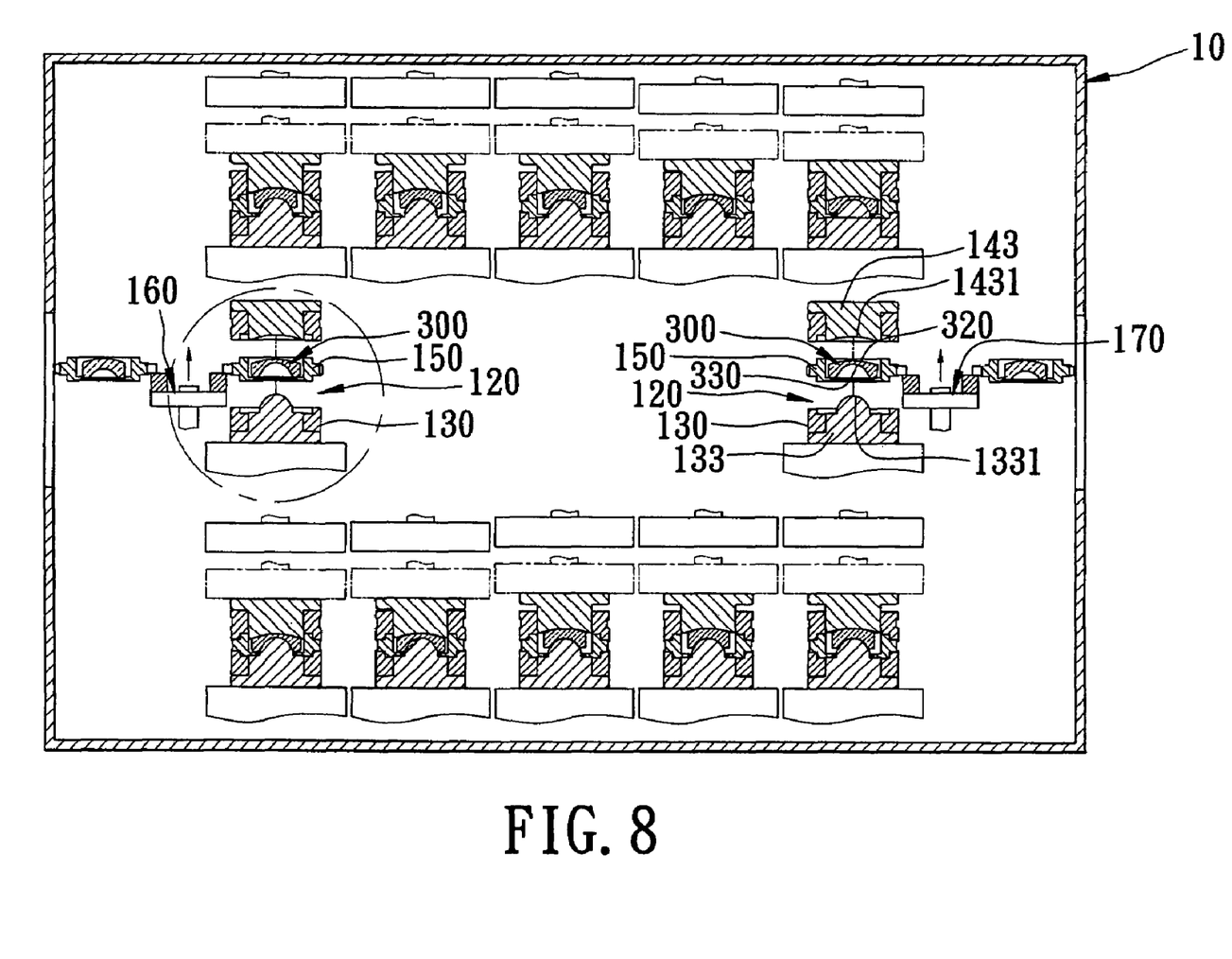
FIG. 8 is the same view as FIG. 7 but with the transfer devices being moved upward.
Figure 9:
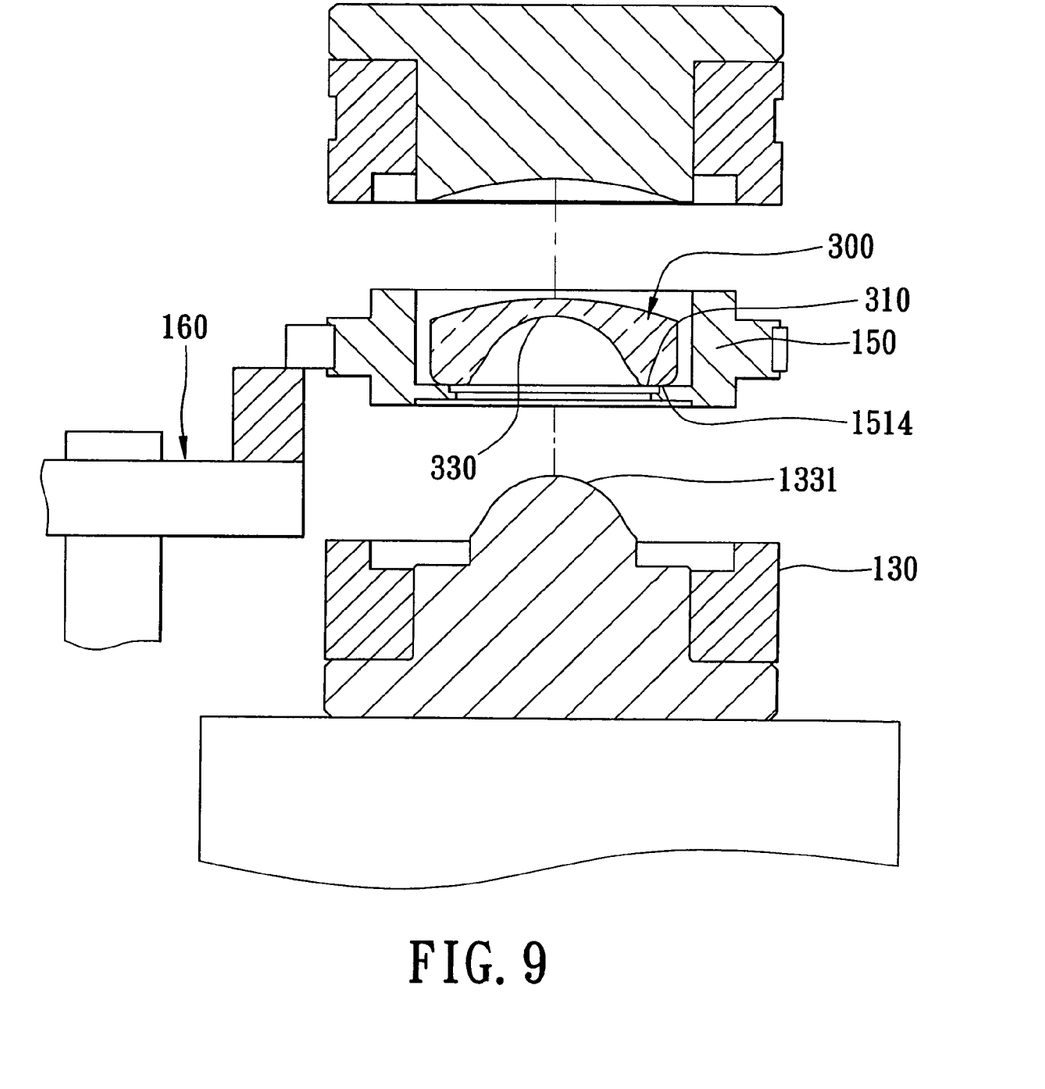
FIG. 9 is an enlarged view of an encircled portion shown in FIG. 8.

Referring to FIGS. 8 and 9, when the forming units 120 are disassembled respectively in the first and second loading/unloading stations 20, 30, the first and second transfer devices 160, 170 are moved upward so that the corresponding sleeve members 150 together with the lens 300 are lifted from the respective lower mold units 130. During this operation, the second shoulder faces 1514 of the sleeve members 150 support and lift the respective lenses 300 from the first forming faces 1331 of the lower molding cores 133.

Figure 10:
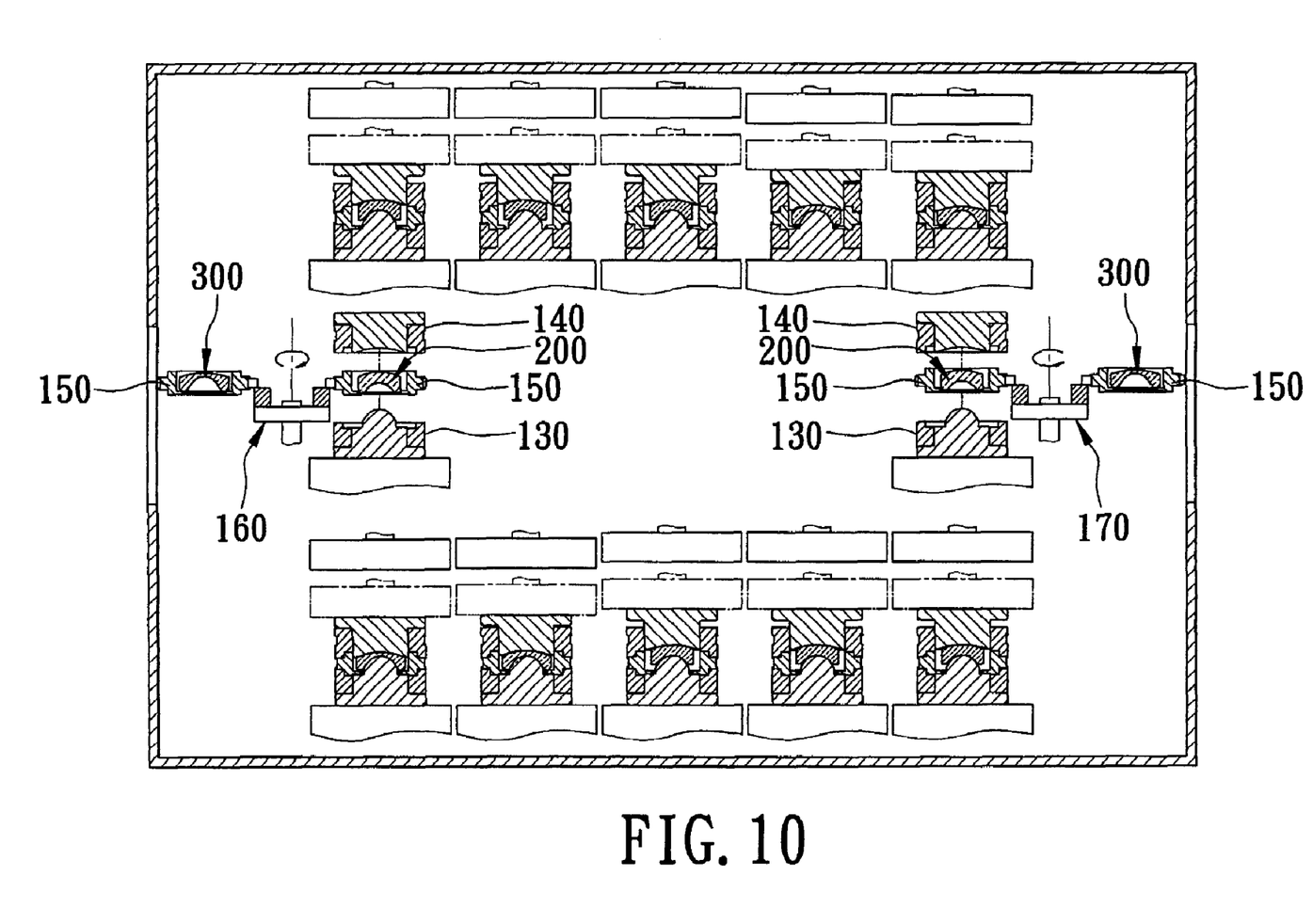
FIG. 10 is the same view as FIG. 8 but with the transfer devices being rotated.
Figure 11:
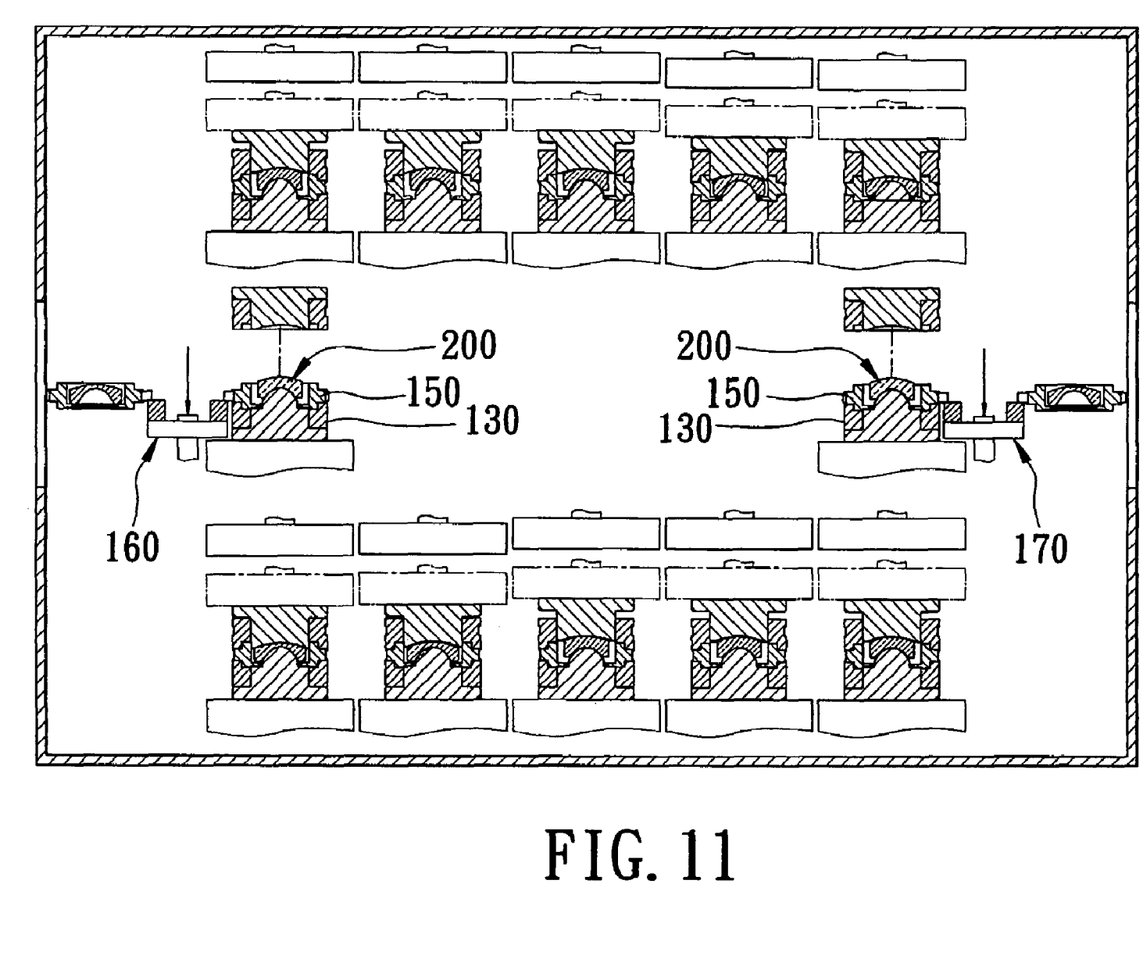
FIG. 11 is the same view as FIG. 10 but with the transfer devices moving downward after being rotated.
Figure 12:
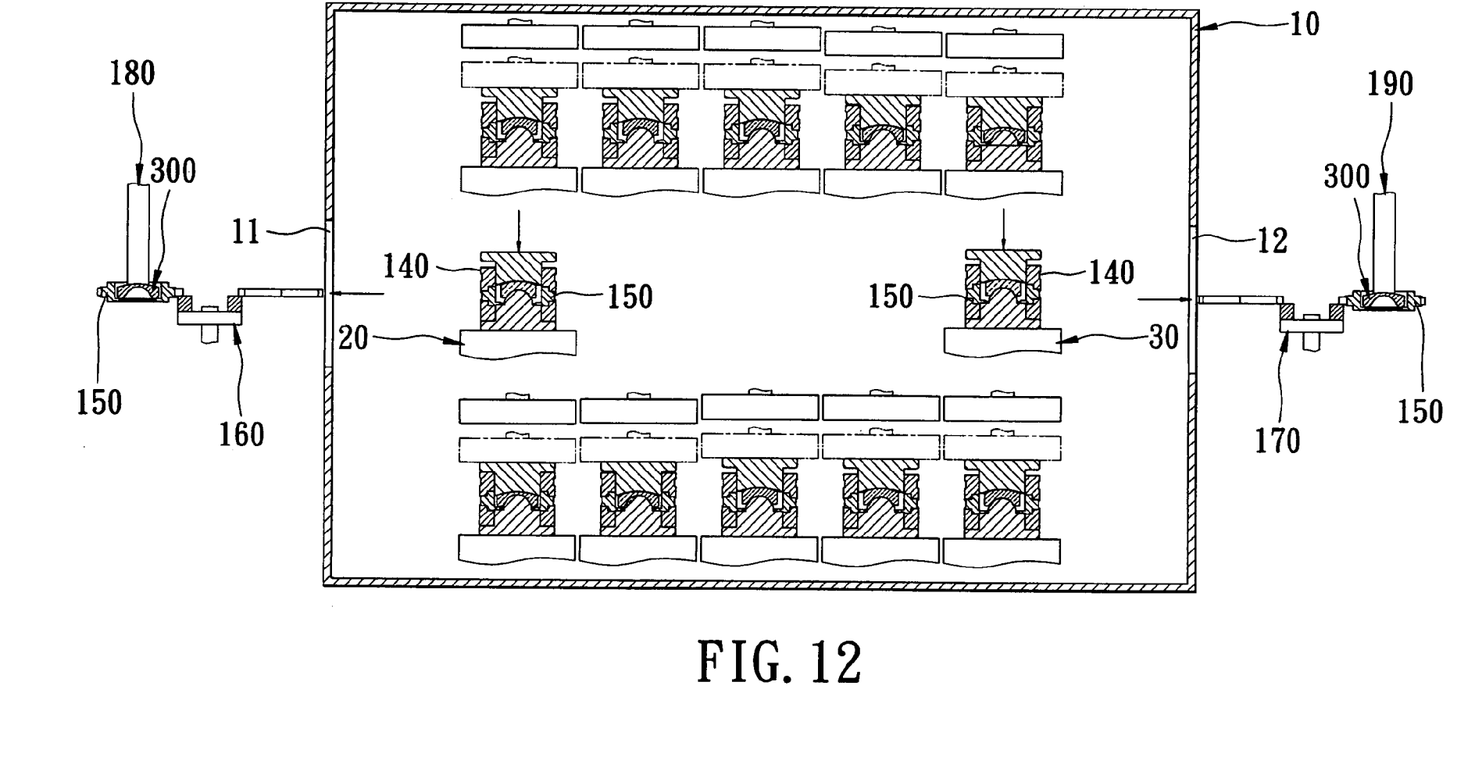
FIG. 12 is the same view as FIG. 11 but with the transfer device being moved out of the forming room.

Referring to FIG. 10, each of the first and second transfer devices 160, 170 rotates to interchange the positions of the sleeve member 150 which holds the glass blank 200 and of the sleeve member 150 which holds the lens 300. Referring to FIG. 11, each of the first second transfer devices 160, 170 moves downward so that each sleeve member 150 with the glass blank 200 is loaded onto the corresponding lower mold unit 130. Referring to FIG. 12, the first and second transfer devices 160, 170 move out of the forming room 10 through the first and second ports 11, 12, respectively, and the upper mold units 140 of the forming units 120 at the first and second loading/unloading stations 20, 30 are moved downward by the respective robot arms 400 (see FIG. 2).

Referring to FIG. 12, the first and second suction devices 180, 190 respectively pick up the lenses 300 from the sleeve members 150 held by the first and second transfer devices 160, 170 so as to transfer the same to respective storage regions (not shown). Thereafter, each of the first and second suction devices 180, 190 places a new glass blank 200 into the corresponding the sleeve member 150, as shown in FIG. 3, to start a next forming operation.

According to the present invention, each forming unit 120 is moved continuously by the advancing device 500 from the first loading/unloading station 20 to the second loading/unloading station 30 through the first heating, first forming, first cooling stations 40, 50, 60 and thereafter returns to the first loading/unloading station 20 through the second heating, second forming, second cooling stations 70, 80, 90. The advantages of the present invention are as follows:

1. Unlike the prior art in which each forming unit 104 can produce only one lens 106 after circulating one time along the loop path, the present invention permits each forming unit 120 to produce two lenses 300 in one circulation. In addition, the number of the forming units 120 in the present invention may be twelve and thus is reduced as compared to the prior art which requires fourteen forming units 104. Therefore, the present invention increases the production efficiency and reduces the cost of production.

2. In the present invention, the upper mold unit 140 and the sleeve member 150 are assembled and disassembled at the same station, i.e. at the first or second loading/unloading station. As compared to the prior art in which assembly and disassembly are performed at different stations, the present invention simplifies the process of transferring and forming the glass blanks 200 and reduces the number of times for correcting the position of each sleeve member 150 or each upper mold unit 140 with respect to the lower mold unit 130. This is because each forming unit 120 performs an aligning operation only at the first or second loading/unloading station 20, 30. Thus, the incidence of misalignment during assembly and disassembly of the forming unit 120 can be lowered.

3. As shown in FIG. 6, when the glass blank 200 is placed on the first shoulder face 1513 of the sleeve member 150, the lateral face 230 of the glass blank 200 is bounded by the third slot section 1523 of the sleeve member 150. As such, when the glass blank 200 is placed within the sleeve member 150 by the first or second suction device 180, 190, or when the sleeve member 150 together with the glass blank 200 is assembled with the lower and upper mold units 130, 140, positional deviation of the glass blank 200 with respect to the axis of the lower mold unit 130 can be avoided. As the glass blanks 200 can be aligned easily with respect to the respective lower mold units 130, the formation of defective lenses with asymmetric thickness can be alleviated and the yield of good quality products can be increased.

4. As shown in FIG. 8, the forming units 120 are disassembled within the forming room 10 to separate upper and lower formed surfaces 320, 330 of the lens 300 from the second and first forming faces 1431, 1331 of the upper and lower molding cores 143, 133. In this state, the peripheral bottom end 310 of the lens 300 is supported by the sleeve member 150. The lens 300 is then transported outward from the forming room 10. Since only the peripheral bottom end 310 of the lens 300 is supported by the sleeve member 150, a major portion of the lens 300 is free of contact with the sleeve member 150 (see FIG. 9). Therefore, when the lens 300 together with the sleeve member 150 is moved from the inside of the hot forming room 10 to the outside thereof, the phenomenon of stresses due to the difference in thermal expansion coefficients of the lens 300 and the sleeve member 150 is unlikely to occur. In the prior art shown in FIG. 1, the forming units 104 are assembled and disassembled at the outside of the forming room 1. Furthermore, in order to avoid stresses due to different thermal expansion coefficients of the forming units 104 and the lens, three successive cooling zones 5 are needed to gradually cool the forming units 104 and the lens 106 to a temperature substantially close to the ambient temperature before the forming units 104 are moved outward from the forming room 1. In the present invention, only one single cooling station, i.e. one first or second cooling station 60 or 90, is needed after the lens 300 is formed. Due to the use of the sleeve member 150 which contacts only a minor portion of the lens 300, the lens 300 need not be cooled to an ambient temperature before moving outward from the forming room 10. Thus, the present invention reduces the number of the cooling stations, increases the production efficiency and lowers the production cost as compared to the prior art.

It should be noted that the second heating, forming, and cooling stations 70, 80 and 90 may be omitted according to the present invention. In this case, the first loading/unloading station 20 may be used to load the glass blank 200, and the second loading/unloading station 30 may be used to unload the lens 300. In addition, the second loading/unloading station 30, together with the second heating, forming, and cooling stations 70, 80 and 90 may be omitted so that the forming units 120 are transported from the first loading/unloading station 20 to the first heating station 40, the first forming station 50, and the first cooling station 60 and are then returned to the first loading/unloading station 20 to continuously produce lenses 300.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A continuous glass forming system, comprising:
a forming room having a first port;
a first loading/unloading station disposed within said forming room proximate to said first port;
at least one first heating station disposed proximate to said first loading/unloading station;

at least one first forming station disposed proximate to said first heating station;

a first cooling station disposed proximate to said first forming station;

a forming device which is advanced successively through said first loading/unloading, first heating, first forming, and first cooling stations, said forming device including at least one forming unit, said forming unit including a lower mold unit, an upper mold unit, and a sleeve member removably assembled between said lower and upper mold units, said sleeve member including a sleeve wall which defines a slot, said sleeve wall having a first shoulder face disposed around said slot and adapted to support a glass blank, and a second shoulder face disposed around said slot and adapted to support a lens formed from the glass blank, said lower and upper mold units respectively having first and second forming faces which are adapted to form the glass blank into the lens within said slot;

a first transfer device disposed proximate to said first port and moving toward and away from said lower and upper mold units to transport said sleeve member; and a first suction device disposed outwardly of said forming room proximate to said first port and adapted to hold and place the glass blank into said sleeve member or to hold and pick up the lens from said sleeve member;

said first transfer device transporting said sleeve member from said lower and upper mold units to said first suction device and vice versa.

2. The continuous glass forming system as claimed in claim 1, further comprising a second heating station, a second forming station, a second cooling station, and a second loading/unloading station, said forming room further having a second port, said second loading/unloading station being disposed proximate to said second port.

3. The continuous glass forming system as claimed in claim 2, further comprising an advancing device for advancing said forming unit from said first loading/unloading station to said second loading/unloading station by successively passing through said first heating, first forming and first cooling stations, and thereafter returning said forming unit from said second loading/unloading station to said first loading/unloading station by successively passing through said second heating, second forming, and second cooling stations.

4. The continuous glass forming system as claimed in claim 3, further comprising a second transfer device that is disposed proximate to said second port and that removes said sleeve member from and that places said sleeve member between said lower and upper mold units.

5. The continuous glass forming system as claimed in claim 4, further comprising a second suction device adapted to hold and place the glass blank into said sleeve member or to pick up and hold the lens from said sleeve member, said first suction device being disposed outwardly of said forming room proximate to said first port, said second suction device being disposed outwardly of said forming room proximate to said second port.

6. The continuous glass forming system as claimed in claim 4, wherein said first and second transfer devices are movable into and out of said forming room through said first and second ports, respectively.

7. A continuous glass forming system, comprising:

a forming room having a first port;

a first loading/unloading station disposed within said forming room proximate to said first port;

at least one first heating station disposed proximate to said first loading/unloading station;

at least one first forming station disposed proximate to said first heating station;

a first cooling station disposed proximate to said first forming station;

a glass blank;

a forming device which is advanced successively through said first loading/unloading, first heating, first forming, and first cooling stations, said forming device including at least one forming unit, said forming unit including a lower mold unit, an upper mold unit, and a sleeve member removably placed on said lower mold unit and below said upper mold unit, said lower and upper mold units respectively having first and second forming faces adapted to form said glass blank into a lens, said sleeve member having a support face to support the glass blank;

a first transfer device disposed proximate to said first port for removing said sleeve member from or returning said sleeve member to said lower mold unit; and a suction device disposed outwardly of said forming room proximate to said first port for placing the glass blank on said support face of said sleeve member.

8. The continuous glass forming system as claimed in claim 7, wherein said first transfer device is movable into and out of said forming room through said first port, said suction device being disposed outwardly of said forming room.

* * * * *